Feb. 12, 1974     JINGO SETO     3,792,137
PROCESS AND APPARATUS FOR FORMING THE BOTTOM STRUCTURE
OF A FOAMED THERMOPLASTIC SYNTHETIC
RESIN-MADE CONTAINER
Filed Feb. 1, 1971     2 Sheets-Sheet 1
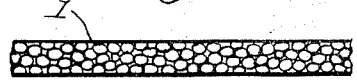
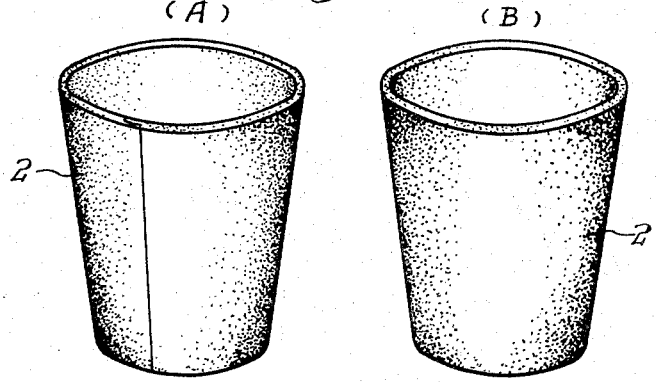
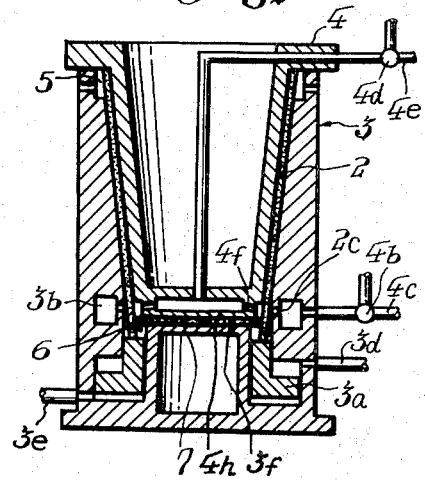
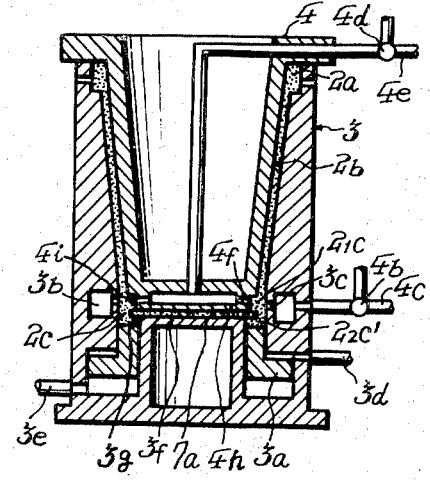
J. SETO
INVENTOR
BY *Stevens, Davis, Miller & Mosher*
ATTORNEY

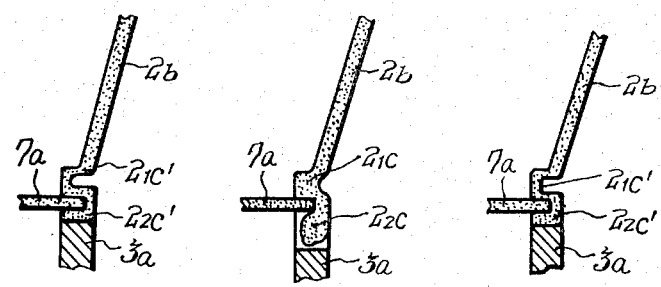
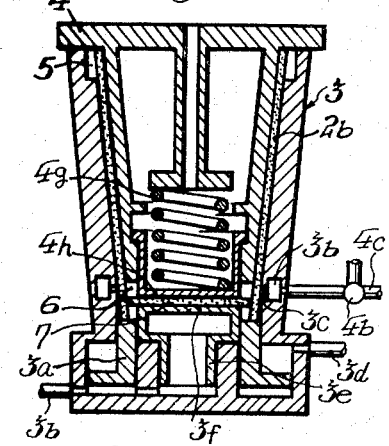
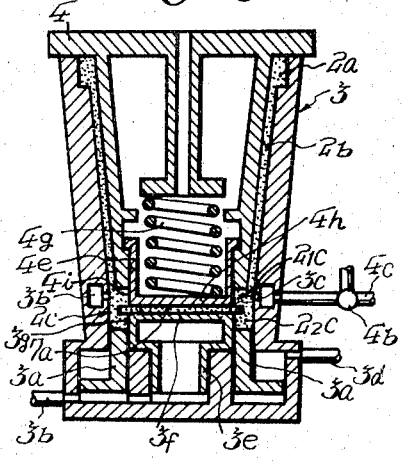
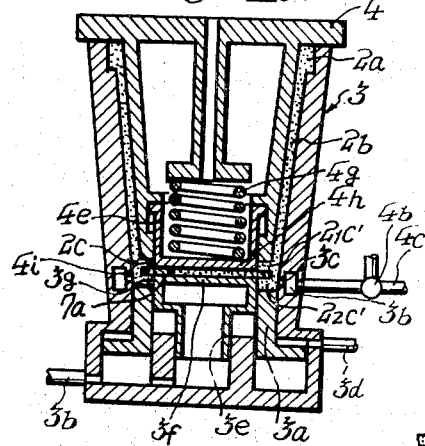
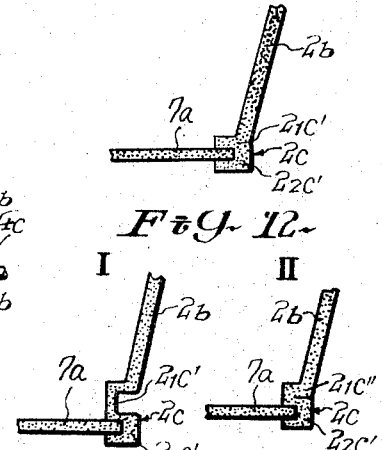
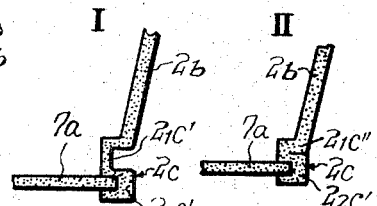

United States Patent Office 3,792,137
Patented Feb. 12, 1974

3,792,137
PROCESS AND APPARATUS FOR FORMING THE BOTTOM STRUCTURE OF A FOAMED THERMOPLASTIC SYNTHETIC RESIN-MADE CONTAINER
Jingo Seto, 6 29-ban 3, 3-chome, Akatsuka Shin-machi, Tokyo, Japan
Filed Feb. 1, 1971, Ser. No. 111,228
Claims priority, application Japan, Feb. 12, 1970, 45/12,368
Int. Cl. B29d 27/00; B29f 5/02
U.S. Cl. 264—45
3 Claims

ABSTRACT OF THE DISCLOSURE

Process and apparatus for the formation of a secure bottom structure of a container wherein a wall-forming piece made from foamed thermoplastic synthetic resin material and a mating bottom-forming material made from thermoplastic or non-thermoplastic material are securely melt joined or mechanically joined together to form the container, with aid of a caulking force exerted on the to-be-joined portions of the wall-forming piece and bottom-forming material in the joining operation.

The present invention relates to a novel process and apparatus for forming the bottom structure of a container having a wall made from a foamed thermoplastic synthetic resin and a bottom made from a foamed thermoplastic synthetic resin or any other suitable material. More particularly, it relates to a novel process and apparatus for fitting a tubular wall-forming piece made from a foamed thermoplastic synthetic resin with a bottom-forming material at one of the ends of the tubular piece to produce a container, such as a cup, can or box, having a wall and a mating bottom which are securely melt bonded to, or mechanically joined with, each other.

The tubular pieces may be cylindrical or prismatic in shape, and they may be obtained from an extrusion molded foamed resin tube or from a foamed resin sheet. The latter preparation is fully described in U.S. patent application Ser. No. 97,954 filed by the same applicant on Dec. 14, 1970, now still pending.

The foamed thermoplastic resins which may be used as materials for the tubular wall-forming piece, include foamed polystyrene, polyethylene, polyvinyl chloride and the like. The materials which may be used as those for the bottom-forming material, include foamed and non-foamed polystyrene, polyethylene and polyvinyl chloride in powder, bead, compacted powder and sheet forms; thermoset synthetic resins such as phenolic and urea resins in powder and compacted powder; and non-thermoplastic materials such as paper, cardboard, a water-proofed cardboard, a wood panel, aluminum foil and tin plate.

The foamed thermoplastic synthetic resins which may constitute the tubular wall-forming piece or may be used as materials for the bottom-forming material, are prepared by foaming the corresponding starting resin material to the extent that the resulting foamed product is, in volume, approximately 7 to 10 times as large as the starting resin material. They, when heated, can increase in plasticity and further foam to expand to the extent that they become approximately 2 to three times as large as what they were in volume. While kept plastic, the further foamed resinous body can be pressed to increase its density and strength and simultaneously be securely bonded to another body made from the same resin as above. By taking advantage of these properties of the foamed thermoplastic synthetic resins, the present invention makes it possible to securely fit the tubular foamed resin wall-forming piece with the bottom-forming material thereby obtaining a more inexpensive, solid and dispensable container, whereas such a container has not been obtained by any conventional processes because sheets of the foamed resins cannot be heat sealed nor melt bonded to each other due to their high insulation property and low density and because suitable binders for the foamed resins have not been available.

FIG. 1 is a diagram showing the cellular structure of a fragmentary foamed thermoplastic synthetic resin sheet from which wall-forming pieces are cut or showing that of an extrusion molded, foamed thermoplastic synthetic resin tube;

FIGS. 2A and 2B illustrate tubular wall-forming pieces made of a foamed thermoplastic resin, one being prepared by cutting a piece out of a foamed thermoplastic sheet and curling it into a tubular form and the other by extrusion molding a foaming thermoplastic resin material into a tubular form;

FIG. 3 is a vertically-sectional view illustrating female and male dies with a wall-forming piece and a mating bottom-forming material in a predetermined limited space therebetween;

FIG. 4 is a vertically sectional view showing a container which is produced from the wall-forming piece and mating bottom-forming material by heating them and pressing upwardly the portion of the expanded piece extending below the bottom-forming material;

FIG. 5 is a vertically sectional view of a secure bottom structure in which the portion of an expanded wall-forming piece located just above a mating bottom-forming material is bent and the portion of the expanded piece located just below the mating material is pressed toward this material;

FIG. 6 is a vertically sectional view of a less secure bottom structure formed only by heating a wall-forming piece and a mating bottom-forming material;

FIG. 7 is a vertically sectional view of the same bottom structure as in FIG. 5, the structure being formed by bending the portion of the expanded piece of FIG. 6 located just above the mating material of FIG. 6 and pressing upwardly the portion of the expanded piece located just below the mating material;

FIG. 8 is a vertically sectional view showing female and male dies with a wall-forming piece and a mating bottom-forming material in a predetermined limited space therebetween, the female die having a vertically movable bottom on which the bottom-forming material is mounted and the male die having a spring-supported, vertically movable top facing the bottom-forming material;

FIG. 9 is a vertically sectional view showing the female and male dies of FIG. 8 in the space between which the wall-forming piece is heated and joined with the bottom-forming material;

FIG. 10 is a vertically sectional view illustrating the female and male dies of FIG. 8 in the space between which the expanded wall-forming piece is more securely joined with the bottom-forming material by pressing the lower expanded piece portion surrounding the peripheral portion of the bottom-forming material;

FIG. 11 is a vertically sectional view showing, in magnified form an improved bottom structure in which the wall and bottom of the container of FIG. 10 are more securely joined together;

FIGS. 12–I and 12–II, are vertically sectional views showing improved bottom structures, the former being securer than substantially the same as that shown in FIG. 7 although they are slightly different in joining procedure from each other and the latter showing the bottom structure more secure than that shown in the former.

Referring to the accompanying drawings, the present invention will be more fully explained. FIG. 1 is a diagram showing the closed or open cellular structure of a foamed thermoplastic synthetic resin from which a wall-forming piece 2 is made. FIG. 2 shows such wall-forming pieces in tubular form. The tubular piece 2 as shown in FIG. 2A is prepared by cutting a piece out of a foamed thermoplastic synthetic resin sheet and curling it into a tubular form with the opposing ends slightly overlapped, but not bonded to each other. The tubular piece 2 as shown in FIG. 2B is prepared by extrusion molding a foaming thermoplastic resin material into a tubular form.

Both the tubular piece 2 and a mating bottom-forming material 7 which may materially be the same as, or different from, the piece, are placed in a female die 3, and a male die 4 is then positioned in the female die by means of a press (not shown) so that a predetermined limited space is formed between the dies as shown in FIG. 3.

The piece 2 and mating material 7 situated between the dies are heated to a temperature at which the piece 2 gets further foamed and made plastic, by heating the dies by a suitable means such as steam heating. The temperature may be approximately 100° C. if the piece used is made from a foamed polystyrene. By this heating, the overlapped end portions of the piece 2 are melt bonded to each other if the piece 2 is such a one as shown in FIG. 2A and simultaneously the piece 2 is further foamed and expanded enough to substantially fill up the wall-making space portion of the predetermined limited space with the expanded piece whereby the lower portion of the expanded piece and the peripheral portion of the bottom-forming material are melt bonded to or joined with each other to produce a container. The predetermined limited space is divided into two space portions which are wall-making and bottom-making space portions for the sake of clear explanation. The wall-making space portion includes upper and lower brim-making space portions 5 and 6 and the remainder thereof (which is a main wall space portion), the portions 5 and 6 being much broader than the main wall space portion, as shown particularly in FIGS. 3 and 8. In the heating step the piece 2 is expanded, while being foamed under atmospheric pressure or vacuum applied via an upper air tube 4e to space between the dies, enough to substantially fill up not only the main wall space portion but also the broader brim-making space portions 5 and 6 with the expanded piece. The expanded piece can be divided into three piece portions 2a, 2b and 2c for the sake of clear explanation, the broader expanded piece portions 2a and 2c being respectively upper and lower brim portions, and the remaining portion 2b being a main wall portion. If at least one of the brim portions 2a and 2c is vertically pressed in the direction toward the other brim portion to form a solid brim, there will be obtained a secure container.

The process and apparatus for the production of a container, which have so far been explained, are more particularly disclosed in the previously mentioned U.S. patent application Ser. No. 97,954, filed by the same applicant, now still pending.

According to the present invention, there may be used, as the wall-forming piece, a tubular piece as shown in FIG. 2A as well as that as shown in FIG. 2B. The tubular wall-forming piece 2 and a mating bottom-forming material 7 may be placed between the dies before or while heating them, and the piece 2 may start to be pressed at the lower end portion located in the broader space portion 6 by raising a lower brim-making press 3a before or during the heating so that the portion of piece 2 or expanding piece 2 extending below the bottom-forming material 7 is bended toward and then pressed against the lower side of said material 7. When continuing to heat the piece 2 and material 7 under such circumstances as above, the peripheral portion of the heated material 7a is securely melt joined (if the material 7 is made from a thermoplastic synthetic resin) or mechanically joined (if the material 7 is made from a non-thermoplastic material) with the lower thicker portion 2c of the expanded piece with aid of the expansive forces of the piece which is expanding into recesses designated at 4i and 3g, the recess 3g being gradually smaller as the press 3a is pushed upward, while the upper end portion of the piece 2 located in the upper broader space portion 5 is expanded to substantially fill up the broader space portion 5 therewith thereby forming an upper brim portion 2a as shown in FIG. 4. The expanded piece $(2a+2b+2c)$ and the heated material 7a so joined therewith are cooled and then released from the dies to produce a container which is leakproof and has other superior properties.

For the sake of clear explanation, the starting bottom-forming material is symbolized by "7" while, after heating, it is symbolized by "7a" for the reason that, when heated, it will physically change if thermoplastic although it will not change if non-thermoplastic; and the portion 2c of the expanded piece, with which the lower broader space portion 6 is substantially filled up, is divided roughly into $2_1C$ and $2_2C$ which are located in the recess 4i above the bottom 7a and in the recess 3g below it, respectively. The portion $2_1C$ serves as an upper bottom retainer to prevent the bottom from getting upward off the wall and the portion $2_2C$ as a lower bottom retainer to prevent the bottom from getting downward off the wall.

In cases where stacking interval for containers is no problem, the containers may be produced so as to have a thicker main wall portion 2b which is the same in thickness as the expanded piece portion 2c.

According to the present invention, when there is used as the wall-forming piece an extrusion molded tubular piece as shown in FIG. 2B or a seamed tubular piece prepared by thermally bonding or pasting together the overlapped end portions of a cylindrically curled piece as shown in FIG. 2A, the wall-forming piece may be heated by steam or hot air only at the upper end portion to form an upper brim structure and at the lower end portion to effect a bond between this portion and the peripheral portion of a mating bottom-forming material using dies which are designed only to form such a brim and bottom structure.

FIG. 5 is a fragmentary vertically-sectional view of the bottom structure of a container in which a tubular piece having a low foaming capability is used as the tubular wall-forming piece 2. Such a container is prepared as follows.

A tubular wall-forming piece 2 having a low-foaming capability and a mating bottom-forming material 7 are placed in a female die, and a mating male die is then inserted in the female die so that a predetermined limited space is formed therebetween as shown in FIG. 3. The piece 2 and the material 7 are heated while or after pushing upward the lower brim press 3a to bend inwardly the piece portion extending below the material 7 and press the bended portion against the lower side of the material 7, thereby forming a bottom structure in which the material 7 is held between the expanded piece portion $2_1C$ which is an upper bottom retainer and the expanded, pressed piece portion $2_2C'$ which is a pressed lower bottom retainer as shown in FIG. 4. Since, however, the starting piece 2 is originally capable of low foaming in this case and the upper bottom retainer $2_1C$ is not pressed, the retainer $2_1C$ is not so securely melt joined or mechanically joined with the upper side of the bottom 7a as the pressed lower bottom retainer $2_2C'$ is joined with the lower side of the bottom 7a. The upper bottom retainer $2_1C$ in this case, may be dispensed with because a sufficiently secure bond is effected between the pressed lower bottom retainer and the lower side of the bottom. If in the above case the piece 2 is a cylindrically curled piece with its opposing end portions slightly overlapping each other as shown in FIG. 2A, the portion of the overlapped end portions present in the retainer $2_1C$ will not so securely be melt bonded to each other.

In order to obtain a secure melt bonding or mechanical joining between the expanded piece portion $2_1C$ and the upper side of the bottom $7a$ or, if the starting piece is one as shown in FIG. 2A, between the overlapped end portions, either air pressure is exerted on the piece portion $2_1C$ while kept plastic by opening a pressure regulating valve $4b$ to pass a pressurized air via a pressure tube $4c$ toward the portion $2_1C$ or vacuum is applied to the piece portion $2_1C$ from the inner side of the male die through a port $4f$ thereby deforming the piece portion $2_1C$ into a concave shape $2_1C'$ in vertical section which serves as a securer upper bottom retainer, as shown in FIG. 5. Such a deforming technique is also applicable to a non-foamable (incapable of foaming) wall-forming piece made from, for example, a high-impact polystyrol.

A container which has such a bottom structure as shown in FIG. 5 and has a wall prepared by heating a wall-forming piece having a low foaming property, is also obtainable by the following process.

A tubular wall-forming piece 2 having a low foaming property and a mating bottom-forming material 7 are firstly heated in such dies as shown in FIG. 3 to produce a container having a bottom structure as shown in FIG. 6. In the bottom structure so obtained, however, the expanded piece portion $2c$ is not so securely melt bonded or mechanically joined with the bottom $7a$ nor the overlapped end portions of a cylindrically curled piece is so securely melt bonded with each other if the curled piece is used as the wall-forming piece. Thus, either air pressure is applied to the outside of the expanded piece portion $2_1C$ or vacuum to the inside thereof to deform the portion $2_1C$ into a concave or groove-like shape in vertical section while pressing the expanded piece portion $2_2C$ by raising the lower brim press $3a$, thereby obtaining a more solid container having a more solid bottom structure as shown in FIG. 7. The containers having any of the bottom structures as shown in FIGS. 4 to 7 have strength enough to be used as dispensable containers such as paper-made cups.

However, containers for a heavy use in preserving or storing wine, soy, oil or the like require a further more solid bottom structure in which the wall and bottom are further more securely melt bonded or mechanically joined together. An example of dies which may be used for the production of such highly solid containers is shown in FIG. 8 (The dies of FIG. 8 are identical with those of FIG. 9 or FIG. 10). The dies as shown in FIG. 8 are essentially different from those as shown in FIG. 3 in that, in the former, the top portion $4h$ of the male die 4 is designed to be vertically movable using a spring mechanism and the bottom $3f$ of the female die 3 is also designed to be vertically movable. FIG. 8 shows a pair of female and male dies 3 and 4 in their original state between which a tubular wall-forming piece 2 and a mating bottom-forming material 7 are placed. The piece 2 and the material 7 are then heated while keeping atmospheric pressure in the space between the dies or applying vacuum thereto, to expand the piece 2 and, if thermally expansible, the material 7 thereby substantially filling up the space between the dies with the expanded piece ($2a+2b+2c$) and material $7a$ as shown in FIG. 9. The thus-obtained bottom structure, in which the expanded piece portion $2c$ is melt bonded or mechanically joined with the peripheral portion of the bottom $7a$, is not so solid or strongly-built for said heavy use. As shown in FIG. 10, in order to form a solid bottom structure suitable for such a heavy use, the vertically movable bottom $3f$ of the female die 3 is pushed upward and the lower brim press $3a$ is simultaneously raised by using a fluid pressure whereby the expanded piece portions $2_1C$ and $2_2C$ are vertically pressed to form denser and firmer portions $2_1C'$ and $2_2C'$ between which the bottom $7a$ is very securely held as shown in FIG. 11, the portions $2_1C'$ and $2_2C'$ serving as more powerful upper and lower bottom retainers, respectively. This treatment should preferably be carried out while the expanded piece (strictly speaking, the expanded piece portion $2c$ in this case) is kept thermally plastic. In this treatment, the heating of the piece 2 and material 7, the upward pushing of the bottom $3f$ of the female die and the raising of the lower brim press $3a$ may simultaneously be carried out and, furthermore, the last one may be effected prior to the other two to inwardly bend the lower end portion of the piece 2 extending below the bottom-forming material 7, which lower end portion so bent is subsequently heated to form the denser and firmer portion $2_2C'$ which is a more powerful lower bottom retainer.

On the other hand, to manufacture containers for such a heavy use, using as the wall-forming piece, a tubular piece having a weakly or no foaming property, the following process is recommendable.

Both a tubular wall-forming piece 2 having a weakly or no foaming property and a mating bottom-forming material 7 are heated in the predetermined limited space between the dies 3 and 4 under atmospheric pressure or vacuum to form a container having a bottom structure which is not so solid for a heavy-duty container, as shown in FIG. 9. In the container so formed, air pressure is applied to the outside of the expanded piece portion $2_1C$ or vacuum is exerted on the inside thereof to bend this portion $2_1C$ so that it takes a concave or groove-like form in vertical section as shown in FIG. 12, I and, simultaneously, the movable bottom $3f$ of the female die 3 and the lower brim press $3a$ are pushed upward to press and make denser the expanded and bent piece portion $2_1C'$ and the expanded piece portion $2_2C$ thereby forming denser piece portions $2_1C''$ and $2_2C'$ which hold the bottom $7a$ therebetween securely enough to render the resulting container adapted for use as the desired heavy-duty container.

In the above-mentioned process, the lower brim press $3a$ may be upwardly pushed while heating the wall-forming piece 2 and bottom-forming material 7 when the piece 2 is made from a material having no foaming property or the press $3a$ may be upwardly pushed halfway before the thorough foaming of the piece 2 and then further upwardly pushed at the same time with the upward pushing of the movable bottom $3f$ of the female die 3 when the piece 2 is made from a material having a foaming property, thus obtaining any of the bottom structures as shown in FIG. 12.

According to the present invention, a cover-forming material, which is materially the same as the bottom-forming material, can securely be joined with the tubular wall-forming piece by the processes so far explained.

As seen from the foregoing, the solidity or strength of the bottom structures in which the wall and bottom are joined together according to the present invention, depends upon a kind of powerful caulking action, which is not necessarily accompanied with melt bonding, of the expanding wall-forming piece on the bottom-forming material, in certain cases, in cooperation with the bending action of air pressure or vacuum applied to the lower end portion of the expanding piece and with the pressing actions of the lower brim press and movable bottom of the female die. Thus the bottom-forming or cover-forming materials which may be employed, include not only the same thermoplastic resin as the wall-forming piece but also a powdery thermoplastic resin (such as foam-producible resin beads), paper, metal and other suitable materials. In addition, there may be used, as the wall-forming piece, a piece consisting of two materially different layers such as a piece consisting of a foamed polystyrol layer with a polyvinyl chloride layer laminated or coated thereon. The present invention makes it possible to produce highly solid containers at a lower cost from a foamed thermoplastic resin which is a more inexpensive material for the wall and bottom of the containers or from the foamed resin as material for the wall and a suitable inexpensive non-thermoplastic material as material for the bottom.

What is claimed is:

1. A process for forming a secure bottom structure of a foamed thermoplastic synthetic resin-made container comprising the steps of placing a plastic or non-plastic bottom-forming sheet material for the container within a tubular wall-forming piece for the container perpendicular to the axis of the wall-forming piece, and above the bottom edge of said tubular wall-forming piece, heating at least the wall-forming piece, pressing upwardly the portion of the wall-forming piece extending below the bottom-forming material and pressing the tubular wall-forming piece immediately above the bottom-forming material inwardly to thereby form a secure bottom structure, said foamed thermoplastic synthetic resin being selected from the group consisting of foamed polystyrene, polyethylene and polyvinyl chloride resins and said plastic bottom-forming material being obtained from a member selected from the group consisting of a foamed polystyrene, polyethylene and polyvinyl chloride and non-foamed polystyrene, polyethylene and polyvinyl chloride.

2. The process according to claim 1 wherein the pressing of the wall-forming piece immediately above the bottom-forming material is effected after the pressing upwardly of the wall-forming piece extending below the bottom-forming material.

3. The process according to claim 1 wherein the pressing of the wall-forming piece immediately above the bottom-forming material is effected simultaneously with the pressing upwardly of the portion of the wall-forming piece extending below the bottom-forming material.

References Cited

UNITED STATES PATENTS

| | | | |
|---|---|---|---|
| 3,344,222 | 9/1967 | Shapiro | 264—51 X |
| 3,315,018 | 4/1967 | Commeyras | 264—51 |
| 3,069,725 | 12/1962 | Root | 264—51 |
| 3,203,611 | 8/1965 | Anderson | 264—321 X |
| 3,658,615 | 4/1972 | Amberg | 264—321 X |
| 3,237,834 | 3/1966 | Davis | 264—321 X |
| 3,553,301 | 1/1971 | Reardon | 264—45 X |
| 3,356,778 | 12/1967 | Anderson | 264—45 |
| 3,411,254 | 11/1968 | Kessler | 264—45 X |
| 3,420,363 | 1/1969 | Blickensderfer | 264—45 X |

DONALD E. CZAJA, Primary Examiner

H. S. COCKERAM, Assistant Examiner

U.S. Cl. X.R.

264—51, 53, 321; 425—293, 817